United States Patent
Jia et al.

(10) Patent No.: US 9,645,008 B2
(45) Date of Patent: May 9, 2017

(54) LIGHT SENSOR WINDOWS FOR ELECTRONIC DEVICES

(71) Applicant: Apple Inc., Cupertino, CA (US)

(72) Inventors: Zhang Jia, Santa Clara, CA (US); Christopher S. Erickson, San Jose, CA (US); James J. Dudley, Sunnyvale, CA (US); Kenichi Nakajima, Kanagawa ken (JP); Chunji Li, ShenZhen (CN)

(73) Assignee: Apple Inc., Cupertino, CA (US)

( * ) Notice: Subject to any disclaimer, the term of this patent is extended or adjusted under 35 U.S.C. 154(b) by 500 days.

(21) Appl. No.: 14/468,177

(22) Filed: Aug. 25, 2014

(65) Prior Publication Data

US 2016/0054175 A1    Feb. 25, 2016

(51) Int. Cl.
*G01J 1/42* (2006.01)
*G01J 1/04* (2006.01)
*G01J 1/02* (2006.01)

(52) U.S. Cl.
CPC .......... *G01J 1/4204* (2013.01); *G01J 1/0233* (2013.01); *G01J 1/0407* (2013.01); *G01J 1/0411* (2013.01); *G01J 1/0418* (2013.01); *G01J 1/0474* (2013.01)

(58) Field of Classification Search
CPC ...... G01J 1/4204; G01J 1/0474; G01J 1/0411; G01J 1/0233; G01J 1/0407; G01J 1/0418
USPC ........................................................ 250/574
See application file for complete search history.

(56) References Cited

U.S. PATENT DOCUMENTS

| | | | | |
|---|---|---|---|---|
| 6,300,632 B1 * | 10/2001 | Liu | ............. | G01J 5/06 |
| | | | | 250/336.1 |
| 7,714,265 B2 * | 5/2010 | Fadell | ............ | G01J 1/4204 |
| | | | | 250/201.1 |
| 7,960,699 B2 * | 6/2011 | Chang | ............ | G01J 1/32 |
| | | | | 250/338.4 |
| 8,730,415 B2 | 5/2014 | Omote et al. | | |
| 2008/0081679 A1 * | 4/2008 | Kawasaki | ............ | H04B 1/3888 |
| | | | | 455/575.8 |
| 2012/0118773 A1 * | 5/2012 | Rayner | ............. | G06F 1/1626 |
| | | | | 206/320 |
| 2012/0170284 A1 | 7/2012 | Shedletsky | | |
| 2014/0009429 A1 | 1/2014 | Verweg et al. | | |
| 2014/0027317 A1 | 1/2014 | Rayner | | |

(Continued)

FOREIGN PATENT DOCUMENTS

EP    2667585    5/2012

*Primary Examiner* — Seung C Sohn
(74) *Attorney, Agent, or Firm* — Treyz Law Group, P.C.; G. Victor Treyz; Joseph F. Guihan

(57) ABSTRACT

An electronic device may be provided with light sensors. The electronic device may have an electronic device housing in which a display is mounted. The display may have a transparent layer such as a transparent display cover layer, a thin-film transistor layer, or a color filter layer. An opaque masking layer such as a layer of black ink may be used to cover an inner surface of the transparent layer in an inactive area of the display. Sensor window openings may be formed in the black ink layer. A layer of ink may be formed in each sensor window opening. Each layer of ink may have a diffuse reflectivity that is matched to that of the black ink. A diffuser layer such as a polymer coating layer with light-scattering particles may be coated on the inner surface of the layer of ink in a sensor window opening.

28 Claims, 11 Drawing Sheets

(56) References Cited

U.S. PATENT DOCUMENTS

2014/0070081 A1   3/2014   Spraggs et al.
2014/0197317 A1   7/2014   Yang et al.

* cited by examiner

LIGHT SENSOR WINDOWS FOR ELECTRONIC DEVICES

BACKGROUND

This relates generally to electronic devices, and, more particularly, to light sensor windows in electronic devices.

Electronic devices such as cellular telephones often contain light sensors. For example, a cellular telephone may use an ambient light sensor to measure the amount of ambient light in the environment in which a cellular telephone is operating. When a large amount of ambient light is detected, screen brightness may be increased to help offset the brightness of the environment.

Some cellular telephones contain proximity sensors that can detect when the cellular telephone has been brought close to a user's face. When the cellular telephone comes into close proximity to the user's face, the touch screen in the cellular telephone can be deactivated to avoid unintentional touch input. This type of proximity sensor may contain a light-emitting diode that emits infrared light and a corresponding infrared light sensor that measures the amount of the emitted infrared light that is reflected back to the infrared light sensor from the user's face.

It can be challenging to mount electronic components such as ambient light sensors and proximity sensors in electronic equipment. If care is not taken, sensors such as these will be exposed to view and may be unsightly. Covering the light sensors with cosmetic structures may help enhance device aesthetics, but can potentially interfere with the transmission and reception of light signals associated with the light sensors.

It would therefore be desirable to be able to provide improved light sensor structures for electronic devices.

SUMMARY

An electronic device may be provided with light sensors such as a proximity sensor and ambient light sensor. The electronic device may have an electronic device housing. A display may be mounted in the electronic device housing. The display may have a transparent layer such as a transparent display cover layer, a thin-film transistor layer, or a color filter layer.

The light sensors may be aligned with light sensor windows in the housing or display. As an example, a light sensor window may be formed in an inactive area of the display.

An opaque masking layer such as a layer of black ink may be used to cover an inner surface of the transparent layer in the inactive area. A sensor window opening may be formed in the black ink layer. A layer of ink may be formed in the sensor window opening. The layer of ink may have a diffuse reflectivity that is matched to that of the black ink. The layer of ink may be more transmissive than the opaque masking layer at infrared wavelengths and, if desired, may be more transmissive than the opaque masking layer at visible wavelengths.

A diffuser layer such as a polymer layer with light-scattering particles may be deposited on the inner surface of the layer of ink in the sensor window opening.

DETAILED DESCRIPTION

Figure 1:
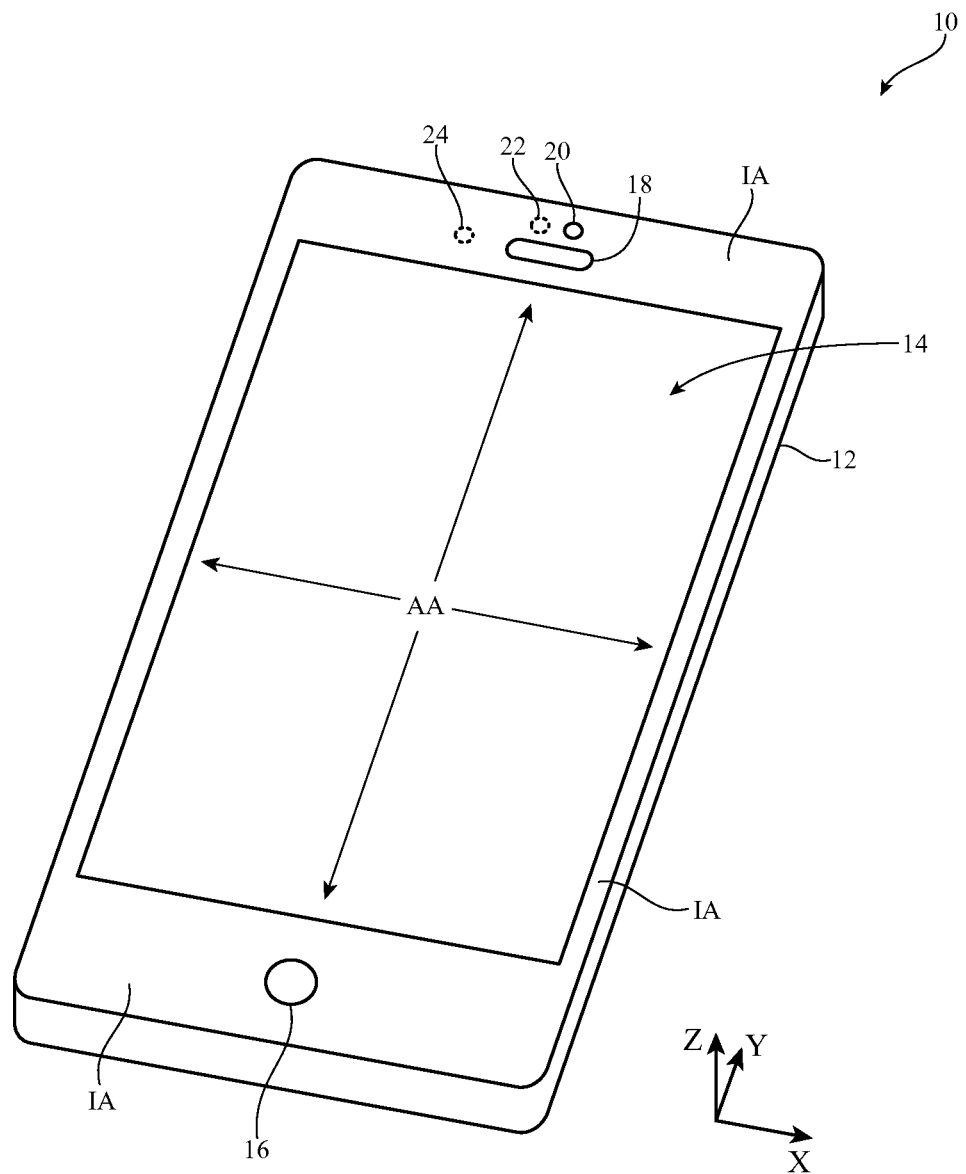
FIG. 1 is a perspective view of an illustrative electronic device with sensors and sensor windows in accordance with an embodiment.

An electronic device such as electronic device 10 of FIG. 1 may contain optical components such as light-based sensors. Electronic device 10 may have a housing such as housing 12. Display 14 may be mounted in housing 12 on the front face of device 10 or in another suitable location. The light-based sensors in device 10 may be mounted in alignment with light sensor windows. The windows may be formed in housing 12, a portion of display 14, or other portion of device 10.

Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels or other light-emitting diodes, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18. Openings may be formed in housing 12 to form communications ports (e.g., an audio jack port, a digital data port, etc.), to form openings for buttons, etc.

Display 14 may have an active area such as active area AA and an inactive area such as inactive area IA. Active area AA may have a rectangular shape or other suitable shape. Active area AA contains pixels that display images for a user of device 10. Inactive area IA is free of pixels and does not display images. Inactive area IA may form an inactive border region around one or more of the edges of display 14. For example, inactive area IA may run around all four peripheral edges of rectangular active area AA or may extend along two of the edges of active area AA (e.g., in a configuration in which display 14 is borderless along two of its edges).

In active area AA, the outermost layer of display 14 such as the display cover layer for display 14 is free of border masking materials. This allows light from the pixels in active area AA to pass through the display cover layer. In inactive area IA, the underside of the outermost display layer (e.g., the display cover layer) may be coated with a layer of opaque masking material. The opaque masking material hides internal components from view by a user and prevents leakage of stray backlight from within device 10.

The opaque masking material may be formed from polymers or other dielectrics, metals, or other materials. For example, the opaque masking material may be formed from one or more layers of white polymer, one or more layers of black polymer (e.g., black ink), or other suitable opaque materials. Configurations in which display 14 is coated with a black masking material such as black ink in inactive area IA may sometimes be described herein as an example. This is, however, merely illustrative. In general, any suitable opaque masking material may be used to coat the underside of display 14 in inactive area IA.

The opaque masking material in inactive region IA is opaque at visible wavelengths and may, if desired, be opaque at other wavelengths such as infrared wavelengths. For example, in configurations in which the opaque masking material is formed from black ink, the opaque masking material may include black particles such as carbon black particles in a polymer matrix. This type of opaque masking material may be opaque at visible and infrared wavelengths.

To accommodate light-based components such as light-based sensors, sensor windows may be formed within the opaque masking material. As an example, sensor windows may be formed at locations such as illustrative sensor window locations 22 and 24 in inactive area IA of display 14 of FIG. 1. A sensor window such as an ambient light sensor may be formed at a location such as sensor window location 22 and a sensor window such as a proximity sensor window may be formed at a location such as sensor window location 24 (as an example). Sensor windows may also be formed for other types of optical components (e.g., status indicator lights, light sensors for blood oximeters, light sensors for light-based input devices such as motion detectors, light-based components for a three-dimensional imaging system, etc.).

If desired, device 10 may have an opening such as opening 20 in the opaque masking layer of inactive area IA that is devoid of all non-transparent materials, thereby allowing unobstructed light to reach a camera in housing 12 (i.e., opening 20 may be a camera window opening). Sensor windows 22 and 24 need not be completely devoid of non-transparent materials. For example, layers of material may be formed in windows 22 and 24 to allow the sensors that are in alignment with these windows to operate normally while simultaneously hiding windows 22 and 24 from view by a user of device 10 to enhance device aesthetics. Because sensor windows of this type are fully or at least partly hidden from view by the naked eye in normal operating environments, these windows may sometimes be referred to as hidden windows, reduced-visibility windows, or invisible windows.

Figure 2:
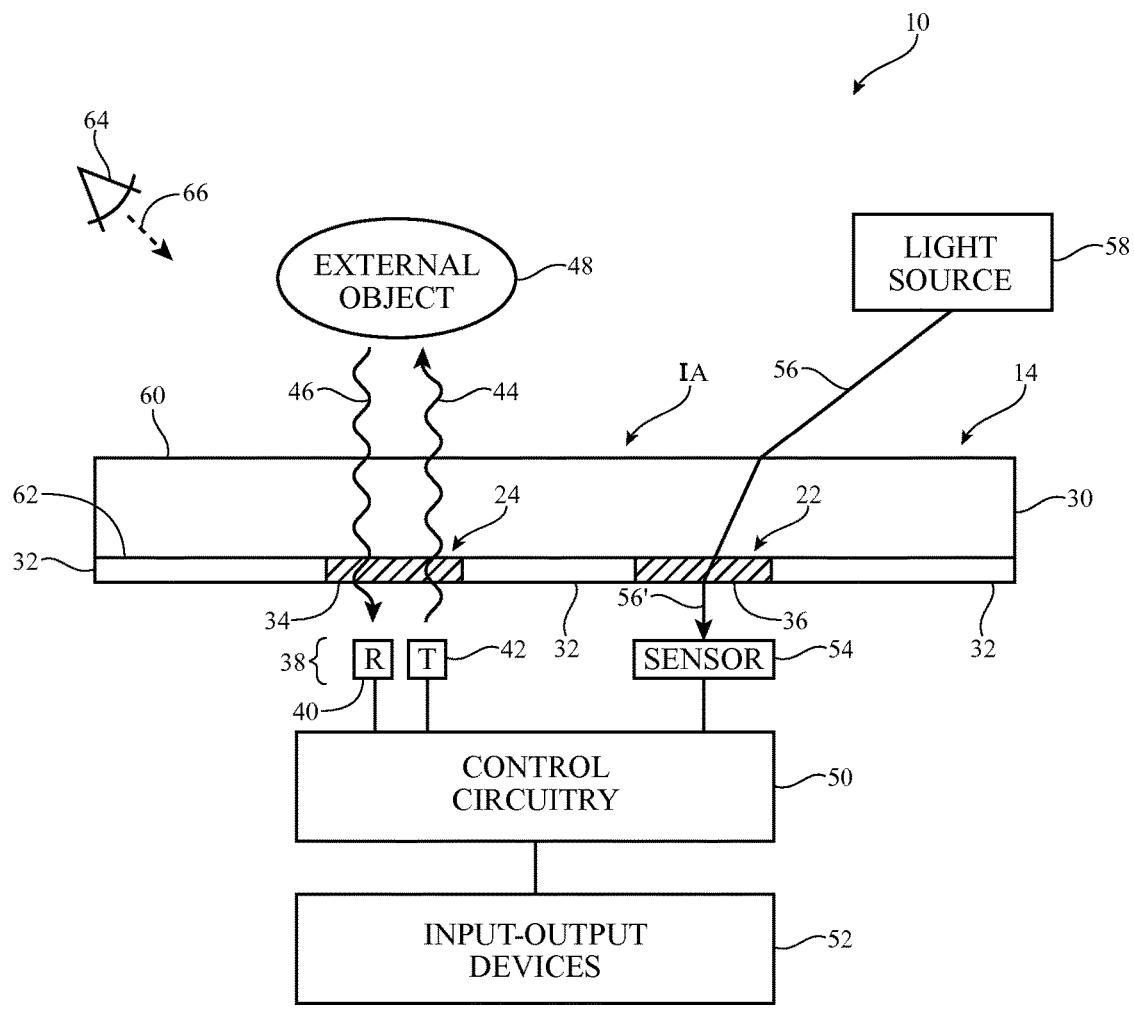
FIG. 2 is a cross-sectional side view of an illustrative electronic device showing how windows may be formed to accommodate a light-based proximity sensor and a light sensor such as an ambient light sensor in accordance with an embodiment.

Consider, as an example, the cross-sectional side view of device 10 of FIG. 2. FIG. 2 is a cross-sectional side view of a portion of display 14 taken through illustrative windows 24 and 22. As shown in FIG. 2, a transparent layer in display 14 (e.g., the outermost layer of display 14) such as display cover layer 30 may have an outer surface such as surface 60 and an opposing inner surface such as surface 62. A layer of opaque masking material 32 may be formed from a coating on inner surface 62 of display cover layer 30. Display cover layer 30 may be formed from a transparent material such as clear glass, clear ceramic, clear plastic, clear crystalline material, sapphire, other transparent materials, combinations of two or more of these materials (e.g., two or more laminated layers) or other display cover layer structures. If desired, the transparent display layer on which opaque masking material 32 is deposited may be an extended portion of a thin-film transistor layer, color filter layer, or other display layer. In other illustrative configurations, opaque masking material 32 may be deposited on a separate transparent layer of material that serves as a protective cover layer for display 14 (i.e., a display cover layer that does not serve as a substrate for thin-film transistors, color filter elements, or other display structures). Configurations in which the supporting layer for opaque masking layer 32 is a display cover layer are sometimes described herein as an example.

Windows such as windows 24 and 22 may be used to allow light from the exterior of device 10 to pass into the interior of device 10 and/or to allow light from the interior of device 10 to pass to the exterior of device 10. The light that passes through windows 24 and 22 may be visible light and/or infrared light. During operation of device 10, a user such as viewer 64 may view inactive area IA of display 14 from the exterior of device 10 (e.g., in viewing direction 66 or other directions). Windows 24 and 22 may be formed from window structures such as window structure 34 and window structure 36 in respective openings in opaque masking layer 32. Structures 34 and 36 are preferably configured to minimize or eliminate the ability of viewer 64 to detect the presence of windows 24 and 22. With one suitable arrangement, windows 24 and 22 are invisible to the naked eye.

In the FIG. 2 example, window 24 is a proximity sensor window that is aligned with light-based proximity sensor 38 and window 22 is an ambient light sensor window that is aligned with ambient light sensor 54. This is merely illustrative. In general, any suitable light-based components (e.g., image sensors or other light detectors, light-emitting diodes, lasers, lamps, or other light emitters, or other light-based devices) may be mounted in alignment with windows in display 14 (e.g., windows in the opaque masking layer in inactive area IA or other device structures).

Proximity sensor 38 may include a light source such as light source 42. Light source 42 may be a laser diode, a light-emitting diode, or other suitable light producing component. Light source 42 may emit light 44. Light 44 may be visible light, infrared light, and/or light at other wavelengths. With one suitable arrangement, light source 42 may be in infrared light-emitting diode that emits infrared light 44. In the absence of external objects, light 44 travels outwardly through window 24 (i.e., through window structure 34 and transparent layer 30) and is not reflected back to proximity sensor 38. When an external object such as object 48 is presence in the vicinity of proximity sensor 38, some of light 44 (i.e., reflected light portion 46) is reflected back from object 48 through window 24 to proximity sensor 38. The amount of reflected light 46 that is measured by proximity detector 38 is indicative of the distance separating external object 48 from device 10 and can therefore be used by proximity sensor 38 to detect the presence or absence of an external object such as external object 48 in the vicinity of device 10.

Light 46 may be detected by proximity sensor 38 using a light detecting component such as light detector 40. Light detector 40 may be an infrared photodetector, a visible photodetector, a light sensor that captures light at multiple different wavelengths (e.g., both visible and infrared wavelengths), or other suitable light sensing component. Light detector 40 may be, for example, a light sensor that detects visible and/or infrared light and that produces a corresponding output signal proportional to the amount of reflected light 46 at the infrared wavelength associated with light 44.

Ambient light sensor 54 may measure how much ambient light is present in the operating environment of device 10. As shown in FIG. 2, external light sources such as light source 58 (e.g., the sun, one or more artificial light sources, etc.) may generate light (e.g., visible and/or infrared light) such as illustrative light ray 56. Light rays such as light ray 56 may pass through window 22 (e.g., through display layer 30 and window structure 36 of window 22). To ensure that ambient light sensor 54 is able to detect the presence of light from directional light sources (e.g., source 58 in the example of FIG. 2), window structure 36 may contain a diffuser structure that helps scatter light such as light 56 from directional sources towards light sensor 54 (see, e.g., scattered light ray 56', which is being detected by light sensor 54 after being scattered by a diffuser in structure 36). Light sensor 54 may be a visible light photodetector, a photodetector that is sensitive to infrared light, and/or other light detecting component. The diffuser structure in window structure 36 may be formed from one or more layers of material with light scattering features (e.g., light-scattering particles, light-scattering voids or hollow particles, light-scattering surface features, etc.). The diffuser structure may be deposited as a coating on top of one or more other layers of material in structure 36.

Control circuitry 50 may be coupled to proximity sensor 38, ambient light sensor 54, and other input-output devices 52. Control circuitry 50 may include storage and processing circuitry for controlling the operation of sensors such as sensors 38 and 54 and other input-output devices 52 and for receiving data from sensors such as sensors 38 and 54 and other input-output devices 52. Control circuitry 50 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 50 may be used to control the operation of device 10. This processing circuitry may be based on one or more microprocessors, microcontrollers, digital signal processors, baseband processor integrated circuits, application specific integrated circuits, etc.

Control circuitry 50 may be used to run software on device 10, such as internet browsing applications, instant messaging applications, mapping applications, telephone call applications, email applications, media playback applications, operating system functions, etc. During use of display 14, control circuitry 50 may gather information from a user and/or information from ambient light sensor 54 and may use this information and/or other information about the operation of device 10 to adjust display brightness or take other actions. Control circuitry 50 may use information from proximity sensor 38 in controlling display 14 (e.g., to turn off display 14 and/or a touch sensor in display 14 whenever proximity sensor 38 indicates that device 10 has been placed against a user's ear as when device 10 is being used to support a cellular telephone call, etc.) or to take other actions.

Device 10 may, in general, use input-output devices such as sensors 38 and/or 54 and, if desired, additional input-output devices such as input-output devices 52 to gather input form a user and the environment in which device 10 is operating and to provide output (e.g., visible and/or audible output, wireless output, output on analog and/or digital data paths, etc.). The input-output devices of device 10 may include user interface devices, data port devices, and other input-output components. For example, input-output devices may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors such as ambient light sensor 54, motion sensors (accelerometers), capacitance sensors, proximity sensors (e.g., a capacitive proximity sensor and/or an infrared proximity sensor such as sensor 38), magnetic sensors, connector port sensors that determine whether a connector such as an audio jack and/or digital data connector have been inserted in a connector port in device 10, a connector port sensor or other sensor that determines whether device 10 is mounted in a dock, other sensors for determining whether device 10 is coupled to an accessory, and other sensors and input-output components. Input-output devices 52 may also include wireless communications circuitry (e.g., a cellular telephone transceiver, a wireless local area network transceiver, antennas, etc.).

Figure 3:
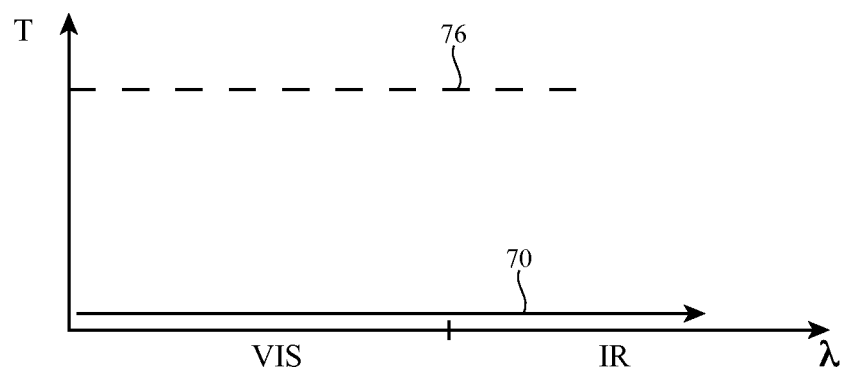
FIG. 3 is a graph of a transmission spectrum for an illustrative layer of black masking material and an illustrative layer of diffuser material in accordance with an embodiment.
Figure 4:
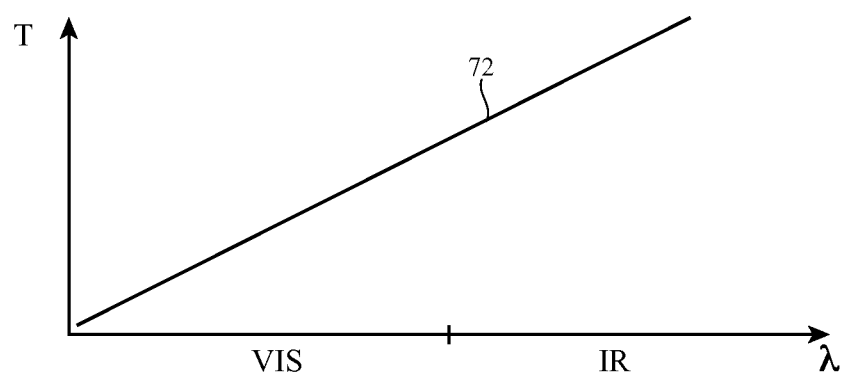
FIG. 4 is a graph of a transmission spectrum for an illustrative ambient light sensor ink layer in accordance with an embodiment.
Figure 5:
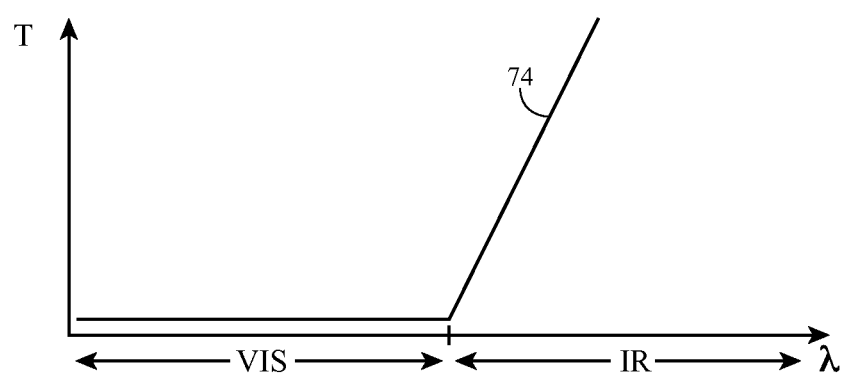
FIG. 5 is a graph of a transmission spectrum for an illustrative proximity sensor ink layer in accordance with an embodiment.

In the graphs of FIGS. 3, 4, and 5, light transmission T has been plotted as a function of wavelength λ for different materials of the type that may be used in forming layers of material in structures 34 and 36 of sensor windows 24 and 22.

Opaque masking material 32 is preferably sufficiently opaque to block internal device components from view by user 64. Opaque masking material 32 may be formed from one or more layers of material (e.g., one or more layers of white ink, one or more layers of black ink, one or more layers of ink of other colors, metal layers, polymer layers, etc.). With one suitable arrangement, which may sometimes be described herein as an example, opaque masking layer 32 is formed from a dark polymer such as a black ink. Black ink for layer 32 may be deposited in one or more sublayers. The black ink may contain a black filler material such as carbon black supported by a polymer matrix formed from a polymer that is cured by application of heat, ultraviolet light, or chemical curing. An illustrative transmission spectrum for black ink 32 is shown by solid line 70 of FIG. 3 (i.e., black ink 32 may transmit relatively light and may block both visible wavelengths VIS and infrared wavelengths IR).

Structure 36 in ambient light sensor window 22 may have a transmission spectrum that is more transparent than black masking material 32 and that can therefore allow ambient light 56 to be measured by sensor 54. At the same time, structure 36 is preferably not too transparent, which would allow sensor 54 to be visible through window 22. With one suitable arrangement, structure 36 includes a layer of ink (sometimes referred to as ambient light sensor ink) that has a transmission spectrum of the type shown by line 72 in FIG. 4 (e.g., structure 36 may transmit more visible light VIS than black ink 32 and may transmit more infrared light IR than visible light VIS).

In proximity sensor 38, light 44 and the reflected portion of light 44 (i.e., light 46) may be light at infrared wavelengths. To allow light 44 and reflected light 46 to pass through structure 34 without excessive attenuation, structure 34 may be formed from one or more layers of ink that is transparent at infrared wavelengths. To ensure that structure 34 blocks internal components from view by viewer 64, the ink material in structure 34 may be opaque at visible wavelengths. For example, structure 34 may contain ink (sometimes referred to as infrared ink) that is transparent at infrared wavelengths IR and that blocks light at visible wavelengths VIS, as shown by illustrative infrared ink transmission spectrum 74 of FIG. 5. Infrared ink may, for example, transmit less light than ambient light sensor ink at visible wavelengths VIS while transmitting more light than the ambient light sensor ink at infrared wavelengths. The transmission of the infrared ink at infrared wavelengths IR may be greater than the transmission of the black ink of layer 32 at infrared wavelengths.

A diffuser for diffusing light (e.g., a diffuser to scatter light 56 to form scattered light 56' that is detected by ambient light sensor 54) may have a transmission spectrum of the type shown by curve 76 of FIG. 3 (e.g., the diffuser may transmit more light than the black masking layer of curve 70 and may be characterized by a relatively flat transmission spectrum in which the diffuser transmits both visible light VIS and infrared light IR). Other transmission spectrums may be used for the diffuser, if desired.

Figure 6:
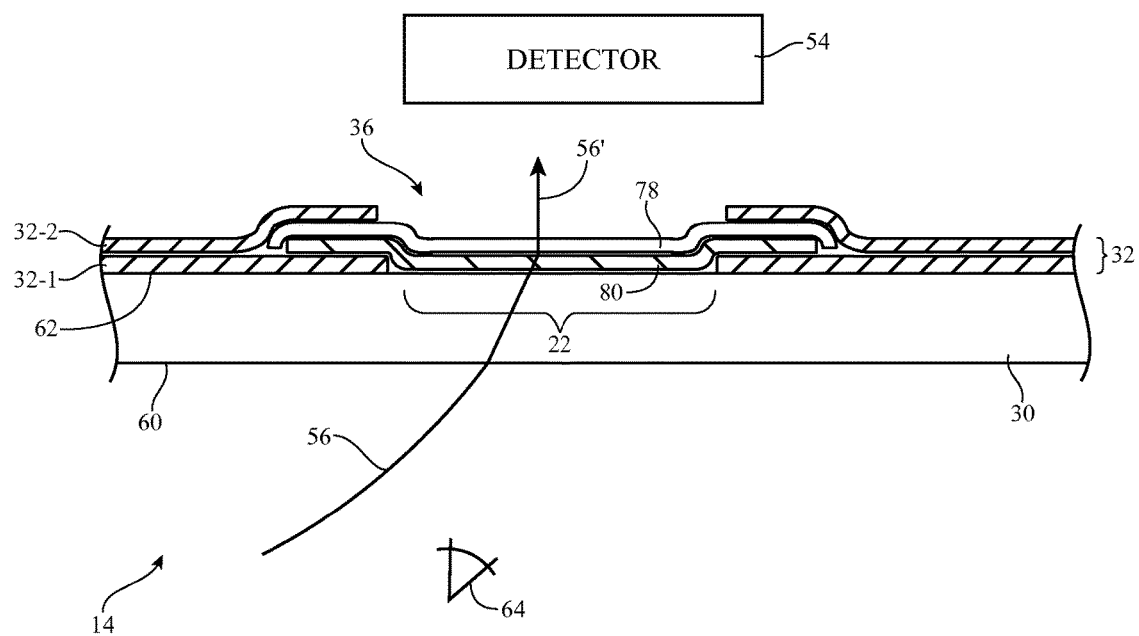
FIG. 6 is a diagram of an illustrative sensor window and associated sensor in a configuration in which the sensor window has a layer of diffuser material deposited over a layer of ambient light sensor ink in accordance with an embodiment.

FIG. 6 is a cross-sectional side view of a portion of display 14 in which layers of material have been formed on inner surface 62 of display layer 30 (e.g., a display cover layer or other transparent display layer) to form structure 36 for ambient light sensor window 22. As shown in FIG. 6, incoming light such as light ray 56 may be scattered by a diffuser formed from diffuser layer 78. Ambient light sensor ink 80 may be interposed between inner surface 62 of display cover layer 30 and diffuser layer 78 to help hide diffuser layer 78 from view by viewer 64. Diffuser 78 may be formed from a coating of polymer or other material formed on ambient light sensor ink 80. During operation, scattered light 56' from diffuser 78 may be detected by detector 54 (e.g., an ambient light sensor). Diffuser 78 is preferably characterized by a haze value of 30% or greater, 60% or greater, 70% or greater, 80% or greater, 85% or greater, 87% or greater, less than 95%, or other suitable values, as measured using the ASTM D1003 haze standard.

Black masking layer 32 may be formed from one or more sublayers. For example, black masking layer 32 may be formed from two sublayers such as outer sublayer 32-1 and inner sublayer 32-2. The combined thickness of the sublayers (i.e., the total thickness of layers 32-1 and 32-2) is preferably sufficient to ensure that light is blocked by layer 32. With one suitable arrangement, black masking layers 32-1 and 32-2 each have a thickness of about ten microns (e.g. 5-15 microns, more than 4 microns, less than 20 microns, etc.), ambient light sensor ink 80 has a thickness of about 4-6 microns, 2-8 microns, more than 3 microns, or less than 13 microns, and diffuser 78 has a thickness of 3-5 microns, more than 2 microns, less than 10 microns, or less than 7 microns. Other layers thicknesses may be used, if desired. The layers of FIG. 6 (and the openings in these layers) may be formed using deposition and patterning techniques such as screen printing, pad printing, spraying, dripping, ink-jet printing, evaporation or other physical vapor deposition techniques, chemical vapor deposition, electrochemical deposition, laser etching, dry or wet chemical etching, machining, photolithography, or other suitable deposition and patterning techniques.

Ambient light sensor ink 80 transmits some ambient light to sensor 54 so that ambient light sensor 54 can make ambient light measurements. As an example, ambient light sensor ink 80 may have a transmittance of 1-10%, greater than 2%, less than 5%, or other suitable value. The transmittance of ambient light sensor ink 80 at visible wavelengths VIS is generally more than the transmittance of black ink layer 32, so that ambient light sensor 54 can receive sufficient light to operate satisfactorily. The presence of diffuser layer 78 on the inner surface of ambient light sensor ink 80 helps scatter off-axis light into detector 54, thereby ensuring that light from directional sources (e.g., spotlights) will be satisfactorily detected by ambient light sensor 54 and taken into account by control circuitry 50 when adjusting display brightness or taking other actions.

Figure 7:
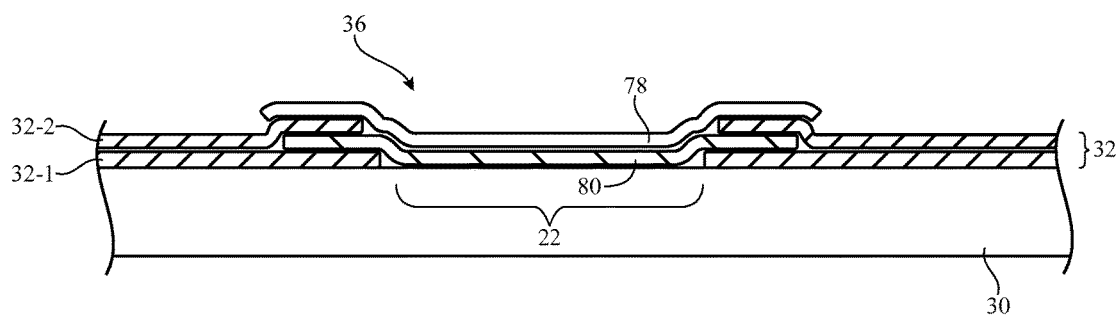
FIG. 7 is a diagram of an illustrative sensor window in which two black masking layers have been deposited prior to deposition of the diffuser material in accordance with an embodiment.
Figure 8:
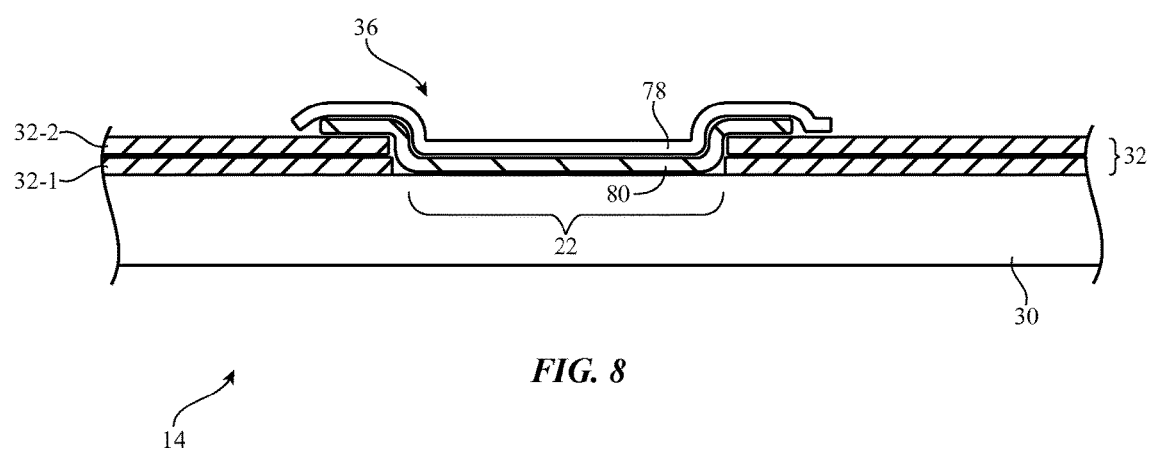
FIG. 8 is a diagram of an illustrative sensor window in which two black masking layers have been deposited prior to deposition of an ambient light sensor ink layer and a diffuser layer in accordance with an embodiment.

In the illustrative configuration of FIG. 6, black ink layer 32-1 was deposited first, ambient light sensor ink 80 was deposited second, diffuser layer 78 was deposited third, and black ink layer 32-2 was deposited fourth. If desired, the layers of material that form structure 36 in sensor window 22 may be deposited in different orders. In the example of FIG. 7, black ink layer 32-1 was deposited first, ambient light sensor ink 80 was deposited second, black ink layer 32-2 was deposited third, and diffuser layer 78 was deposited fourth. FIG. 8 is a cross-sectional side view of structure 36 for window 22 in an illustrative configuration in which black ink layer 32-1 was deposited first, black ink layer 32-2 was deposited second, ambient light sensor ink layer 80 was deposited third, and diffuser layer 78 was deposited fourth. The visibility of features such as the edges of the opening for window 22 by viewer 64 can be minimized by depositing layer 32-1 before the other layers of structure 36. If desired, however, other deposition orders may be used when depositing layers 32-1, 32-2, 80, and 78. The configurations of FIGS. 6, 7, and 8 are merely illustrative.

Figure 9:
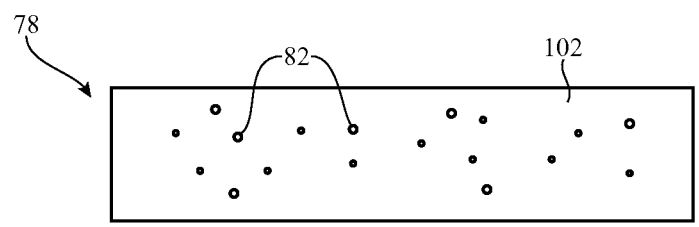
FIG. 9 is a cross-sectional side view of diffuser material that has light-scattering particles in a polymer matrix in accordance with an embodiment.
Figure 10:
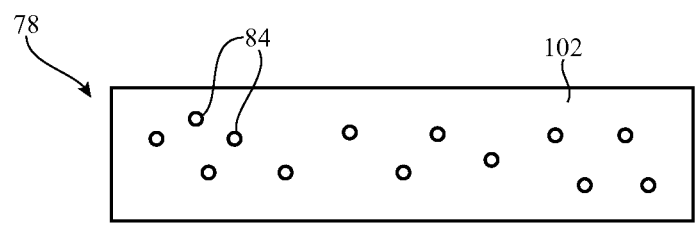
FIG. 10 is a cross-sectional side view of diffuser material that has light-scattering features such as bubbles or hollow microspheres in accordance with an embodiment.
Figure 11:
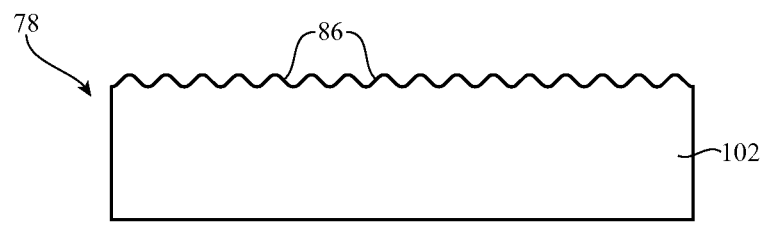
FIG. 11 is a cross-sectional side view of an illustrative diffuser layer having a textured inner surface to diffuse light in accordance with an embodiment.

Diffuser 78 may be formed from a layer of material such as a polymer that includes light-scattering features. As shown in FIG. 9, for example, diffuser 78 may be formed by polymer 102 that includes light-scattering particles 82. Light scattering particles 82 may be pigments such as metal oxide particles or other particles (e.g., titanium dioxide particles, zinc oxide particles, particles of oxides and other materials containing elements and compounds antimony, barium, sulfur, sulfur oxide, plastic or glass beads, or other suitable light-scattering particles). FIG. 10 shows how diffuser 78 may be formed by incorporating voids 84 into polymer matrix 102. Voids 84 may be bubbles, voids associated with hollow structures such as microspheres, or voids in other gas-filled or vacuum-filled structures. In the example of FIG. 11, diffuser 78 has been formed by creating a textured surface such as surface 86 on the inside surface of polymer layer 102. If desired, combinations of the approaches shown in FIGS. 9, 10, and 11 may be used and/or other approaches for forming diffuser layer 78 may be used. The configurations of FIGS. 9, 10, and 11 are merely illustrative.

Figure 12:
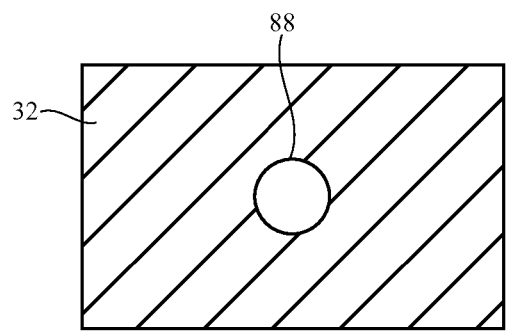
FIG. 12 is a top view of an illustrative black masking layer opening for a sensor window in accordance with an embodiment.

FIG. 12 is a top view of an illustrative sensor window opening for sensor windows such as windows 22 and 24. Window openings such as opening 88 of FIG. 12 may be formed in black masking layer 32 to allow light to pass through black masking layer 32. Structures such as structures 34 and 36 of FIG. 2 may be formed on the surface of transparent layer 30 within opening 88.

In the example of FIG. 12, opening 88 in black masking layer 32 is circular in shape. The diameter of opening 88 may be 500 microns to 3 mm, may be 100-1000 microns, may be 300-800 microns, may be more than 20 microns, may be more than 400 microns, or may be less than 3 mm (as examples). Openings such as opening 88 may have other shapes, if desired (e.g., square, rectangular, oval, shapes with straight edges, shapes with curved edges, shapes with both curved and straight edges, etc.).

Figure 13:
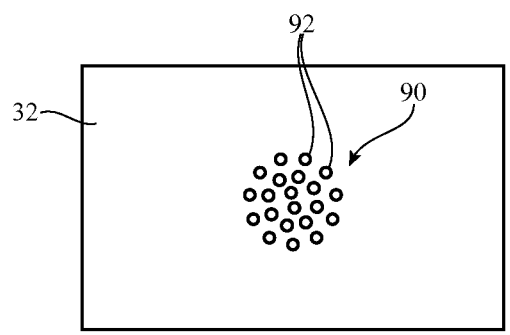
FIG. 13 is a top view of an illustrative black masking layer opening formed from a group of perforations in accordance with an embodiment.

In the illustrative configuration of FIG. 13, opening 90 for a sensor window has been formed from a group of multiple smaller openings 92. The overall outline of opening 90 may be circular, oval, square, rectangular, or may have a different shape. Opening 90 may have lateral dimensions of 500 microns to 3 mm or other suitable size (e.g., more than 300 microns, less than 3 mm, etc.). Openings 92 may be smaller perforations and may be formed by laser drilling or other suitable hole formation techniques. Openings 92 may, as an example, be circular openings having diameters of 10-60 microns, more than 5 microns, less than 75 microns, less than 60 microns, etc. Non-circular shapes may be used for perforations 92 if desired.

Figure 14:
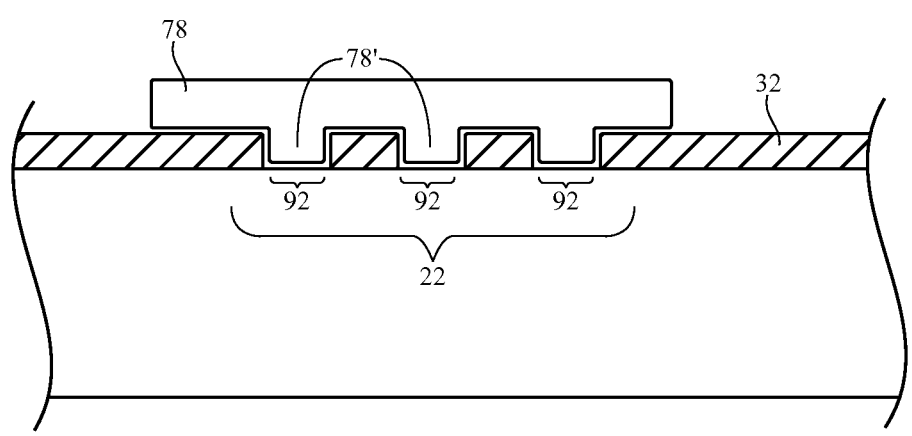
FIG. 14 is a cross-sectional side view of an illustrative sensor window formed from a perforated black masking layer covered with a diffuser layer in accordance with an embodiment.

When openings 92 are sufficiently small (e.g., 10-60 microns in diameter or less), openings 92 will be invisible to the naked eye. In this situation and other suitable situations, some of the layers of structures 34 and/or 36 can be omitted. As an example, ambient light sensor ink layer 80 may be omitted from structure 36 in ambient light sensor window 22, as shown in FIG. 14. With the illustrative configuration of FIG. 14, ambient light sensor window 22 has been formed by a group of multiple small openings such as perforations 92 (e.g., 2-50 perforations, 5-25 perforations, etc.). The area of each perforation 92 is preferably small enough to make perforations 92 invisible to the user, while the total area associated with perforations 92 is sufficient to allow ambient light to pass to detector 54. Diffuser 78 may overlap perforations 92. Portions of diffuser layer 78 such as portions 78' may optionally penetrate partly or fully into perforations 92. The presence of diffuser 78 may help scatter off-axis light (e.g., when window 22 is used as an ambient light sensor window for ambient light sensor 54).

If desired, optical characteristics of the outermost layer of material in a sensor window may be configured to match or nearly match the optical characteristics of black masking layer 32. This may help hide the sensor window from view by user 64. Consider, as an example, window 120 of FIG. 15. Window 120 has been formed from an opening in black masking layer 32 on inner surface 62 of a transparent display layer such as display cover layer 30. The opening is filled with window structure 94. Window structure 94 may include an outer layer (i.e., a layer of material that coats inner surface 62 of display cover layer 30) such as an outer layer of infrared ink, an outer layer of ambient light sensor ink, or other material. Window structure 94 may also include one or more inner layers (e.g., a diffuser layer such as diffuser layer 78, etc.). In some scenarios (e.g., when forming a light-based proximity sensor) it may be desirable to omit inner layers such as diffuser layer 78.

Figure 15:
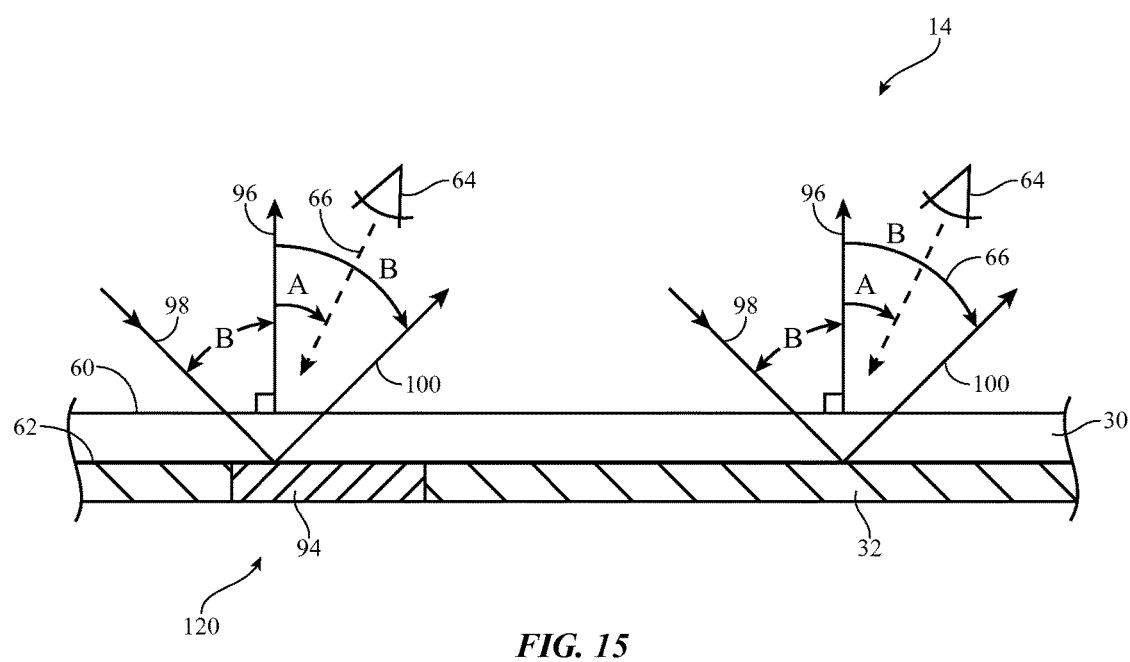
FIG. 15 is a cross-sectional side view of a sensor window and adjacent portions of an opaque masking layer that are characterized by respective diffuse reflectivity values that differ by less than a given amount in accordance with an embodiment.

Window structure 94 (e.g., the outermost layer of material in structure 94 such as the infrared ink layer in proximity sensor window 24 or the ambient light sensor ink layer in ambient light sensor window 22) may be characterized by a diffuse reflectivity. As shown in FIG. 15, outer surface 60 of display cover layer 30 may have a surface normal such as surface normal 96. Incoming light 98 may reflect from the material of structure 94 at the interface between structure 94 and inner surface 62 to produce reflected light ray 100. In a scenario in which incoming light 100 is oriented at an angle B with respect to surface normal 96, reflected light 100 that is oriented at angle B with respect to surface normal 96 is associated with a specular reflection. Viewer 64 may view structure 94 in direction 66. Direction 66 may be oriented at an angle A with respect to surface normal 96 that is not the same as angle B. The amount that light 98 reflects from a structure such as structure 94 at angles such as angle A that differ from angle B of reflected light ray 100 is sometimes referred to as the diffuse reflectivity of the structure. As demonstrated on the right hand side of FIG. 15, both structure 94 and structure 32 may be characterized by respective diffuse reflectivity values.

To minimize the visibility of window 120, the diffuse reflectivity of window structure 94 is preferably within a given amount of the diffuse reflectivity of black masking layer 32 (e.g., these values differ by less than 50%, less than 20%, less than 15%, less than 10%, or less than 5%). In situations in which the diffuse reflectivity of structure 94 in light sensor window 120 is the same (or nearly the same) as the diffuse reflectivity of opaque masking layer 32, it will be difficult or impossible for viewer 64 to identify the location of window 120 (i.e., window 120 will be invisible to viewer 64). It may therefore be desirable to ensure that the diffuse reflectivity of structures such a structure 34 (e.g., an infrared ink layer) and structure 36 (e.g., an ambient light sensor ink layer covered with a diffuser layer) are equal (or nearly equal) to the diffuse reflectivity of black masking layer 32 in device 10 of FIG. 2.

Figure 16:
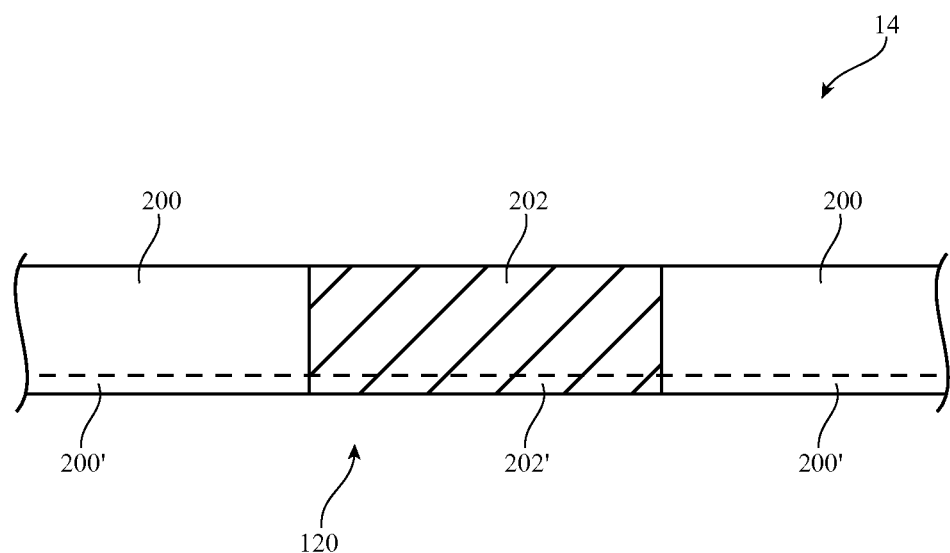
FIG. 16 is a cross-sectional side view of a sensor window formed from a lens in a display cover layer or other device structure in accordance with an embodiment.

If desired, a sensor window may be implemented using a lens that is installed within a display cover layer or other portion of device 10. As shown in FIG. 16, for example, sensor window 120 may be formed from lens 202 in layer 200. Layer 200 may be part of a display (e.g., a glass or plastic display cover layer or other display layer), may be part of an electronic device housing, or other structure on the exterior of device 10. Layer 200 may be opaque to hide internal components from view and/or may be provided with an opaque coating such as coating 200'. Layer 200 may, for example, be a tinted glass or plastic layer and/or may have a coating such as coating 200' that is formed from an inorganic or metallic coating. Polymer coatings and other opaque masking layer coatings may also be used in forming coatings such as coating 200'.

Lens 202 may be formed from glass, polymer, or other transparent material. Lens 202 may be tinted (e.g., by incorporating a pigment, dye, or other tint into the material that forms lens 202) and/or may be coated with a coating such as coating 202'. Coating 202' may include an organic coating (e.g., an infrared-transparent ink or other ink), may include an inorganic coating (e.g., a tinted or clear oxide or nitride, etc.), may be formed from a metallic layer, or may be other suitable inorganic and/or organic coating for modifying light transmittance through lens 202. Diffuser layer 78 may be included in coating 202' (e.g., under or above an inorganic or metallic coating, etc.). To minimize the visibility of window 120, the diffuse reflectivity of window structure 202 (e.g., window 202 and coating 202') is preferably within a given amount of the diffuse reflectivity of surrounding structures such as layer 200 (e.g., layer 200 with coating 200') (e.g., these values differ by less than 50%, less than 20%, less than 15%, less than 10%, or less than 5%). The structures of FIG. 16 may form part of the inactive area of display 14 or other portion of device 10.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
    a housing;
    a display mounted in the housing, wherein the display has a transparent layer with an active area and an inactive area and wherein the inactive area is coated with a layer of opaque masking material;
    a sensor; and
    a sensor window formed from an opening in the opaque masking material, wherein the sensor window includes a layer of diffuser material that is deposited on the transparent layer and that covers the opening, and wherein the sensor is aligned with the sensor window and receives light through the sensor window.

2. The electronic device defined in claim 1 wherein the layer of diffuser material comprises a polymer coating layer having light-scattering features.

3. The electronic device defined in claim 2 wherein the light-scattering features comprise light-scattering particles.

4. The electronic device defined in claim 2 wherein the light-scattering features are selected from a group consisting of: light-scattering surface texture on the layer of diffuser material and voids in the diffuser material.

5. The electronic device defined in claim 1 wherein the layer of diffuser material has a haze value of greater than 60%.

6. The electronic device defined in claim 5 further comprising a polymer layer interposed between the layer of diffuser material and the transparent layer.

7. The electronic device defined in claim 6 wherein the polymer layer comprises a layer of ink.

8. The electronic device defined in claim 7 wherein the layer of ink has a greater visible light transmittance than the layer of opaque masking material.

9. The electronic device defined in claim 8 wherein the light sensor comprises an ambient light sensor and wherein the layer of opaque masking material comprises black ink.

10. The electronic device defined in claim 8 wherein the layer of ink and the layer of opaque masking material have diffuse reflectivities that differ by less than 10%.

11. The electronic device defined in claim 1 further comprising:
    a layer of ink between the layer of diffuser material and the transparent layer; and
    a display, wherein the transparent layer comprises a display cover layer that protects the display.

12. The electronic device defined in claim 1 wherein the opening includes a plurality of perforations having lateral dimensions of less than 60 microns.

13. The electronic device defined in claim 1 further comprising:
    a first layer of ink between the layer of diffuser material and the transparent layer;
    an additional sensor in the housing; and
    an additional sensor window aligned with the additional sensor, wherein the additional sensor window is formed from an additional opening in the opaque masking layer, and includes a second layer of ink that covers the additional opening, and wherein the additional sensor receives light through the additional opening.

14. The electronic device defined in claim 13 wherein the first layer of ink and the layer of opaque masking material have diffuse reflectivities that differ by less than 20%.

15. The electronic device defined in claim 14 wherein the second layer of ink and the layer of opaque masking material have diffuse reflectivities that differ by less than 20%.

16. A display, comprising:
    a transparent layer having opposing outer and inner surfaces;
    an opaque masking layer coating on a portion of the inner surface;
    a sensor window opening in the opaque masking layer;
    a layer of ink on the inner surface in the opening;

a diffuser layer deposited on the layer of ink in the opening.

17. The display defined in claim 16 wherein the diffuser layer comprises a polymer coating layer with light-scattering particles.

18. The display defined in claim 17 wherein the diffuser layer has a thickness of less than ten microns, wherein the opaque masking layer has a first transmittance, and wherein the layer of ink has a second transmittance greater than a first transmittance.

19. The display defined in claim 18 wherein the layer of ink has an infrared transmittance and has a visible transmittance that is less than the infrared transmittance.

20. Apparatus, comprising:
a transparent display cover layer;
a black ink layer on the transparent display cover layer;
a light sensor window opening in the black ink layer; and
a layer of ink in the opening, wherein the black ink layer and the layer of ink in the opening have diffuse reflectivities that differ by less than 20%.

21. The apparatus defined in claim 20 wherein the layer of ink in the opening has a greater visible light transmittance than the black ink layer, the apparatus further comprising:
a layer of polymer diffuser material on the layer of ink in the opening.

22. The display defined in claim 21, wherein the layer of polymer diffuser material comprises a polymer coating that includes light scattering pigment particles.

23. The display cover layer defined in claim 22 wherein the layer of polymer diffuser material has a haze value of greater than 60%.

24. An electronic device, comprising:
a housing;
a display mounted in the housing, wherein the display has a transparent layer with an active area and an inactive area;
a sensor; and
a sensor window formed from a lens in an opening in the transparent layer, wherein the sensor window includes a layer of diffuser material that is deposited on the lens and that covers the opening, and wherein the sensor is aligned with the sensor window and receives light through the sensor window.

25. The electronic device defined in claim 24 wherein the layer of diffuser material comprises a polymer coating layer having light-scattering features.

26. The electronic device defined in claim 25 wherein the light-scattering features comprise light-scattering particles.

27. The electronic device defined in claim 25 wherein the light-scattering features are selected from a group consisting of: light-scattering surface texture on the layer of diffuser material and voids in the diffuser material.

28. The electronic device defined in claim 24 wherein the layer of diffuser material has a haze value of greater than 60%.

* * * * *